US006327479B1

United States Patent
Mikkola

(10) Patent No.: US 6,327,479 B1
(45) Date of Patent: Dec. 4, 2001

(54) PROCEDURE AND SYSTEM FOR THE TRANSMISSION OF A SHORT MESSAGE IN A TELECOMMUNICATION NETWORK

(75) Inventor: Orvo Mikkola, Jaali (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/527,949

(22) Filed: Mar. 13, 2000

Related U.S. Application Data

(63) Continuation of application No. PCT/FI98/00714, filed on Sep. 11, 1998.

(30) Foreign Application Priority Data

Sep. 22, 1997 (FI) ........................................ 973754

(51) Int. Cl.⁷ .................................................. H04Q 7/14
(52) U.S. Cl. ..................... 455/466; 455/38.4; 455/566; 340/825.44
(58) Field of Search ..................... 455/466, 426, 455/560, 500, 33.1, 53.1, 54.1, 403, 422, 454, 550, 552; 379/57, 89; 370/328, 337, 347, 349, 310, 410

(56) References Cited

U.S. PATENT DOCUMENTS

| 5,351,235 | * | 9/1994 | Lahtinen ............................ 370/58.1 |
| 5,628,051 | * | 5/1997 | Salin .................................. 455/33.1 |
| 5,768,509 | * | 6/1998 | Gunluk ............................ 395/200.33 |
| 5,794,142 | * | 8/1998 | Vanttile et al. ...................... 455/419 |
| 5,806,000 | * | 9/1998 | Vo et al. ............................... 455/466 |
| 5,878,397 | * | 3/1999 | Stille et al. ............................ 704/466 |
| 5,903,726 | * | 5/1999 | Donovan et al. ............... 395/200.36 |
| 5,946,629 | * | 8/1999 | Sawyer et al. ....................... 455/466 |
| 5,946,630 | * | 8/1999 | Willars et al. ....................... 455/466 |
| 6,078,820 | * | 6/2000 | Wells et al. .......................... 455/466 |
| 6,085,100 | * | 7/2000 | Tarnanen ............................. 455/466 |
| 6,091,958 | * | 7/2000 | Bergkvist et al. ................... 455/456 |
| 6,108,530 | * | 8/2000 | Ayabe et al. ......................... 455/403 |
| 6,108,559 | * | 8/2000 | Astrom et al. ....................... 455/466 |
| 6,151,507 | * | 11/2000 | Laiho et al. ......................... 455/466 |

FOREIGN PATENT DOCUMENTS

| 97/14254 | 4/1997 | (WO) . |
| 97/20442 | 6/1997 | (WO) . |
| 98/02005 | 1/1998 | (WO) . |

OTHER PUBLICATIONS

International Search Report for PCT/FI98/00714 filed Sep. 1998.

* cited by examiner

*Primary Examiner*—Daniel Hunter
*Assistant Examiner*—Pablo Tran
(74) *Attorney, Agent, or Firm*—Altera Law Group, LLC

(57) ABSTRACT

Procedure and system for the transmission of a short message in a telecommunication network comprising a mobile communication network (1) which comprises a first short-message service center (2); a telephone network (3) in which digital signalling is used and which is linked to the mobile communication network; and a number of terminal device (4; 41, 42, . . . , 4n) compatible with the mobile communication and/or telephone network, in which procedure the short message is generated by means of a terminal device and sent to the intended receiver. According to the invention, the telephone network (3) is connected to the first short-message service centre (2) via a first data communication link (6). The subscriber type identifier of the receiver is added to the short message, and the short message is transmitted to the first short-message service centre (2). The receiver's subscriber type is checked in the short-message service centre and, based on this, the short message is transmitted by the appropriate route to the intended receiver.

11 Claims, 3 Drawing Sheets

PROCEDURE AND SYSTEM FOR THE TRANSMISSION OF A SHORT MESSAGE IN A TELECOMMUNICATION NETWORK

This application is a continutation of PCT/FI98/00714, filed Sep. 11, 1998.

FIELD OF THE INVENTION

1. Description of Related Art

The present invention relates to a procedure and to a system for the transmission of short messages in a telecommunication network. In particular, the invention relates to the transmission of short messages in an ISDN network (ISDN, Integrated Services Digital Network) and between an ISDN network and a GSM network (GSM, Global System for Mobile Communications).

2. Summary of the Invention

ISDN means a digital services network which has been developed from a digital telephone network by complementing it with ISDN features according to international recommendations and standards. ISDN subscriber lines may be either basic access lines or system lines. A basic access line gives the user two B-channels with a transmission capacity of 64 kbit/s for the transmission of speech, data or combined speech and data. In addition, the basic access line comprises a D-channel with a transmission capacity of 16 kbit/s. The D-channel is used for subscriber line signalling and possible packet-format transmission of user data. The channel structure of the line is thus 2B+D. The basic access line allows simultaneous use of e.g. an ISDN telephone and a data terminal. Structurally, the basic access line is a passive line and it permits the connection of max. eight terminal devices.

A GSM system consists of a mobile telephone, a system of base transceiver stations and a switching system as well as connections or interfaces for linkage to public telephone networks. The signalling between a wired telephone network and a mobile telephone network is implemented using common channel signalling (CCS). The same mobile telephone can be used in different GSM networks in Europe. Location tracing requires a great deal of signalling in the wired telephone network. For the mobile telephone to be usable, it needs to be provided with a subscriber card comprising a microprocessor and a storage unit, i.e. a SIM card (SIM, Subscriber Identity Module). Stored on the subscriber card are the customer information, the data stored by the customer, such as telephone numbers and the services available for the customer in the GSM network. The wireless link between the terminal device and the GSM system base station is completely digital.

Besides conventional telephone service, GSM makes a numerous variety of other services available to the user. The services have been mainly designed on the basis of the ISDN network specification, taking the limitations caused by the radio link and the mobility of the mobile telephone into account. One of the GSM services is the short message service, which enables the transmission of messages of max. 160 characters from the message transmission system to a mobile telephone and vice versa. The short message service provides numerous possibilities for more effective communication, users of GSM telephones can send short messages to each other or receive e.g. the title data of e-mail messages, and users can be sent chargeable services, such as weather information, in the form of short messages.

The ISDN standards do not comprise a definition of a short message service like that of the GSM network. There are also no standards defining the transmission of short messages between GSM and ISDN networks. Thus, there is the problem that, even if the terminal equipment and telephones were capable of generating short messages, the standardisation and network signalling do not permit the transmission of short messages. Therefore, it is desirable that, as the use of mobile telephones and short messages is becoming more widespread, there should be a possibility to send short messages even in wired telephone networks, e.g. ISDN networks.

The object of the present invention is to eliminate the problem described above. A further object of the invention is to produce a new type of procedure and system in a telephone network that enables the transmission of short messages between a mobile communication network and a wired network as well as within a wired network. Another object of the invention is to describe a simple technical solution for the transmission of short messages between networks.

As for the features characteristic of the invention, reference is made to the claims.

The system of the invention for the transmission of a short message in a telecommunication network comprises a mobile communication network, which comprises a first short-message service centre. The mobile communication network is preferably a GSM network provided with a short message transmission capability. The system also comprises a telephone network that uses digital signalling and is connected to the mobile communication network by means known in themselves in telephony. The telephone network is preferably an ISDN telephone network. Connected to the mobile communication network and telephone network are a number of terminal devices, mobile stations and ISDN terminals, by means of which a short message is generated and sent to the intended receiver.

In the system of the invention, the first short-message service centre is connected to the telephone network via a first communication link.

According to the invention, when a short message is being generated, it is provided with the receiver's subscriber type identifier, which may be e.g. the subscriber number of the receiver. Next, the short message is transmitted to the first short-message service centre. The receiver's subscriber type and possibly telephone number are checked in the short-message service centre and, based on this, the short message is transmitted to the intended telephone network subscriber if the receiver is a subscriber in a telephone network, and if the receiver is a subscriber in a mobile communication network, the short message specifications for the mobile communication network, known in themselves, are used and the short message is transmitted via the first short-message service centre to the receiver.

As compared with prior art, the present invention has the advantage that it enables the transmission of short messages even between a mobile communication network and a telephone network. Thus, the short message service known in the mobile communication network can be extended to the wired telephone network as well.

In a preferred embodiment of the present invention, in addition to the first short-message service centre, the system comprises one or more short-message service centres or corresponding devices or gateways that are used to match the transmission link between the first short-message service centre and the telephone network. Such an arrangement may be needed to match the short-message service centre with the telephone network. The communication between the first short-message service centre and the telephone network is preferably implemented using DSS1 (DSS, Digital Signalling System) or ISUP (ISUP, Integrated Services User Path) signalling.

As the setup of an ISDN call typically takes only a short time, it is possible to use the queuing feature of the telephone network if the subscriber or the short-message service centre is busy at the time the setup of a call addressed to them is started. The delay caused by the queuing is so short that it will not significantly affect the transmission of the short message, but it will flexibly eliminate "unnecessary" transmission failures due to a busy signal received when short messages are to be transmitted. Such use of the queuing function is previously known in the art and will therefore not be described in detail in this context.

If a short message is transmitted from an ISDN network to a GSM network or from a GSM network to an ISDN network, then the routing of the short message is handled by the first short-message service centre, which is connected to the mobile communication network. When a short message is sent from an ISDN terminal or to an ISDN terminal, a call is set up between the terminal and the first shot-message service centre in order to transmit the message to a second short-message service centre. The transmission of the short message is implemented using ISDN UUS-signalling (UUS, User to User Signalling) so that the UUS information elements needed for the transmission of the short message are transmitted during the ringing phase to the first short-message service centre or to the terminal. However, no actual call is set up between the short-message service centre and the ISDN terminal.

In a preferred embodiment of the invention, the identifier of the receiver is transmitted in the called party subaddress field.

Moreover, in a preferred embodiment of the procedure of the invention, the transmission is monitored to determine whether the message is successfully transmitted to the intended subscriber and the sender of the short message is notified of the successful/unsuccessful outcome of the transmission. In this way, the sender can ascertain whether the message was correctly delivered or not.

In a preferred embodiment, the terminal equipment of the invention comprises means for the storage of predetermined short messages and for selecting them for transmission. Moreover, the ISDN terminal in a wired telecommunication network preferably supports the UUS1 and subaddressing supplementary services. Using said storage means, it is possible to create for the terminal equipment e.g. a menu control system which enables the user to select a predetermined short message to be transmitted and which allows the sender to specify the receiver to the terminal equipment.

BRIEF DESCRIPTION OF THE DRAWINGS

In the following, the invention will be described in detail by referring to the attached drawings, wherein.

DETAILED DESCRIPTION OF THE INVENTION

Figure 1:
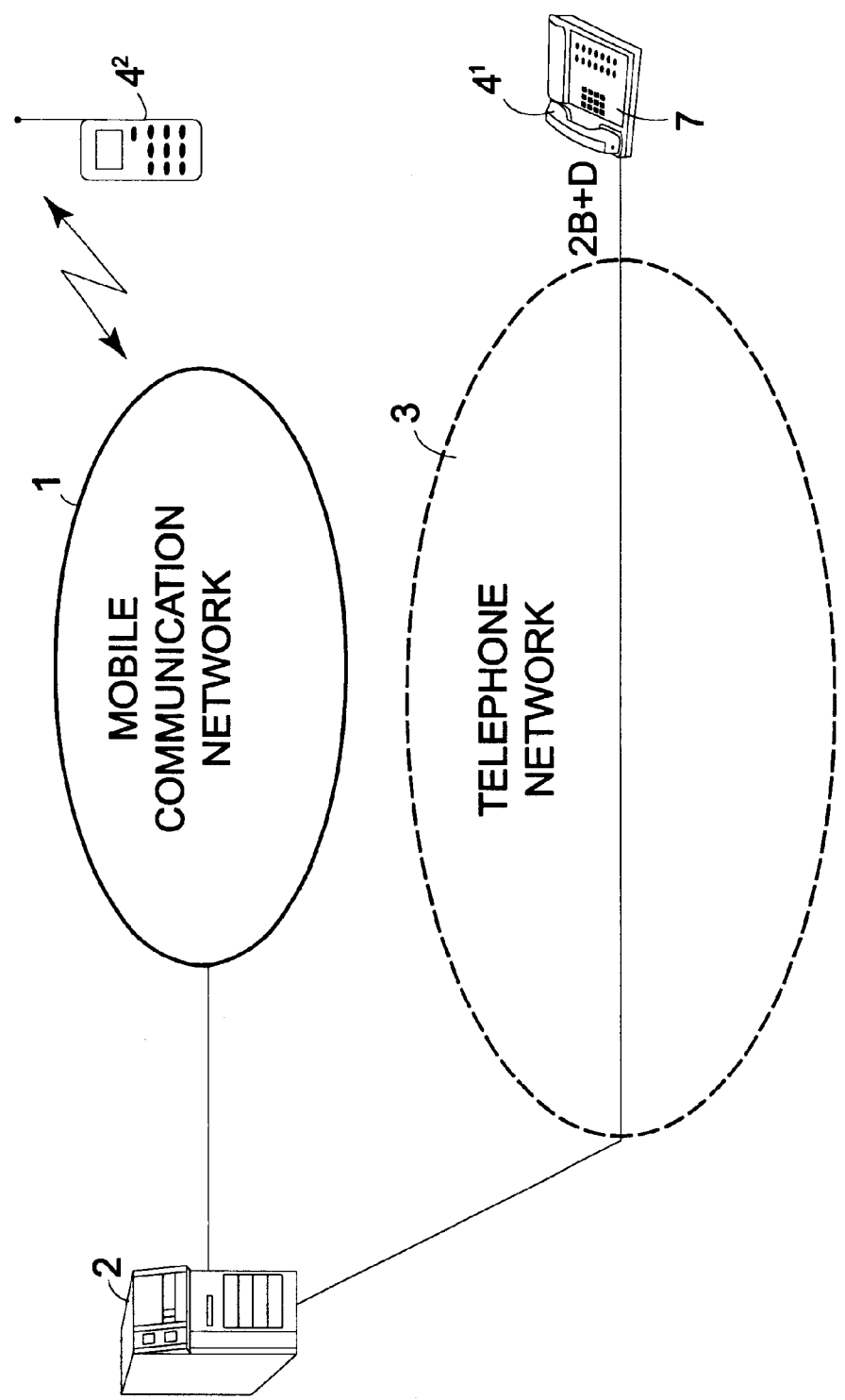
FIG. 1 represents a preferred system according to the invention.

The system presented in FIG. 1, which is a simple embodiment of the present invention, comprises a mobile communication network 1 and a telephone network 3. The mobile communication network is a GSM network known in itself, over which the users communicate using GSM mobile telephones $4^2$. The GSM standards define a short-message service (SMS, Short Message Service). Using this service, the users of the mobile communication network may send short messages of 160 characters over the GSM network. The telephone network 3 comprises a local exchange LE (not shown) that supports ISDN signalling. A terminal device $4^1$ is connected to the local exchange LE via an ISDN basic access line (2B+D). The GSM network comprises a first short-message service centre 2, which is part of prior-art technology and commonly used in mobile communication networks.

Figure 2:
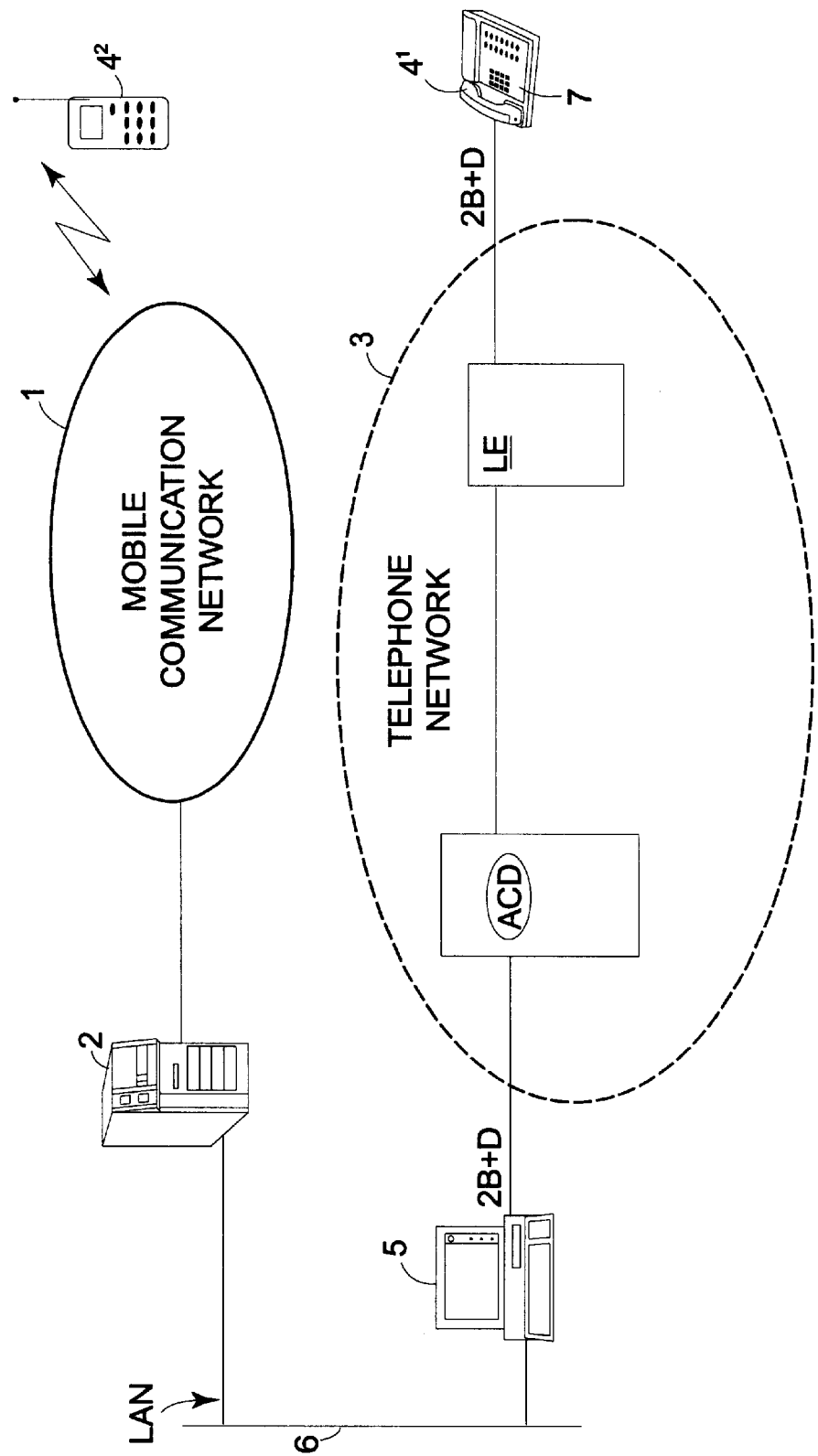
FIG. 2 represents another preferred system according to the invention.

The system presented in FIG. 2 additionally comprises a second short-message service centre 5. The second short-message service centre 5 may be a computer or equivalent and it is generally connected to the telephone network via an ISDN basic access line. It is also possible to connect the second short-message service centre to the telephone network via an ISDN system line (30B+D) if the capacity of the link is to be increased. The first and the second short-message service centres 2, 5 are connected to each other via a first data communication link 6, which preferably may be a local area network LAN or an equivalent data network. FIG. 2 also diagrammatically illustrates the call queuing function ACD in the telephone network, which makes it possible to place a call received from the terminal device $4^1$ in queue if the second short-message service centre 5 is busy. As the transmission of a short message to the short-message service centre 2, 5 only takes a short time, the user will hardly notice the delay caused by the queuing.

According to the basic idea of the invention, short messages between the GSM network and the ISDN network are transmitted via the first data communication link 6 between the short-message service centres. Therefore, the transmission of short messages between the network can be implemented using a separate data connection. The first data link can be set up in the telephone network e.g. as an ISDN connection. Let it be further noted that different alternatives for setting up a data link 6 are obvious to a person skilled in the art.

Figure 3:
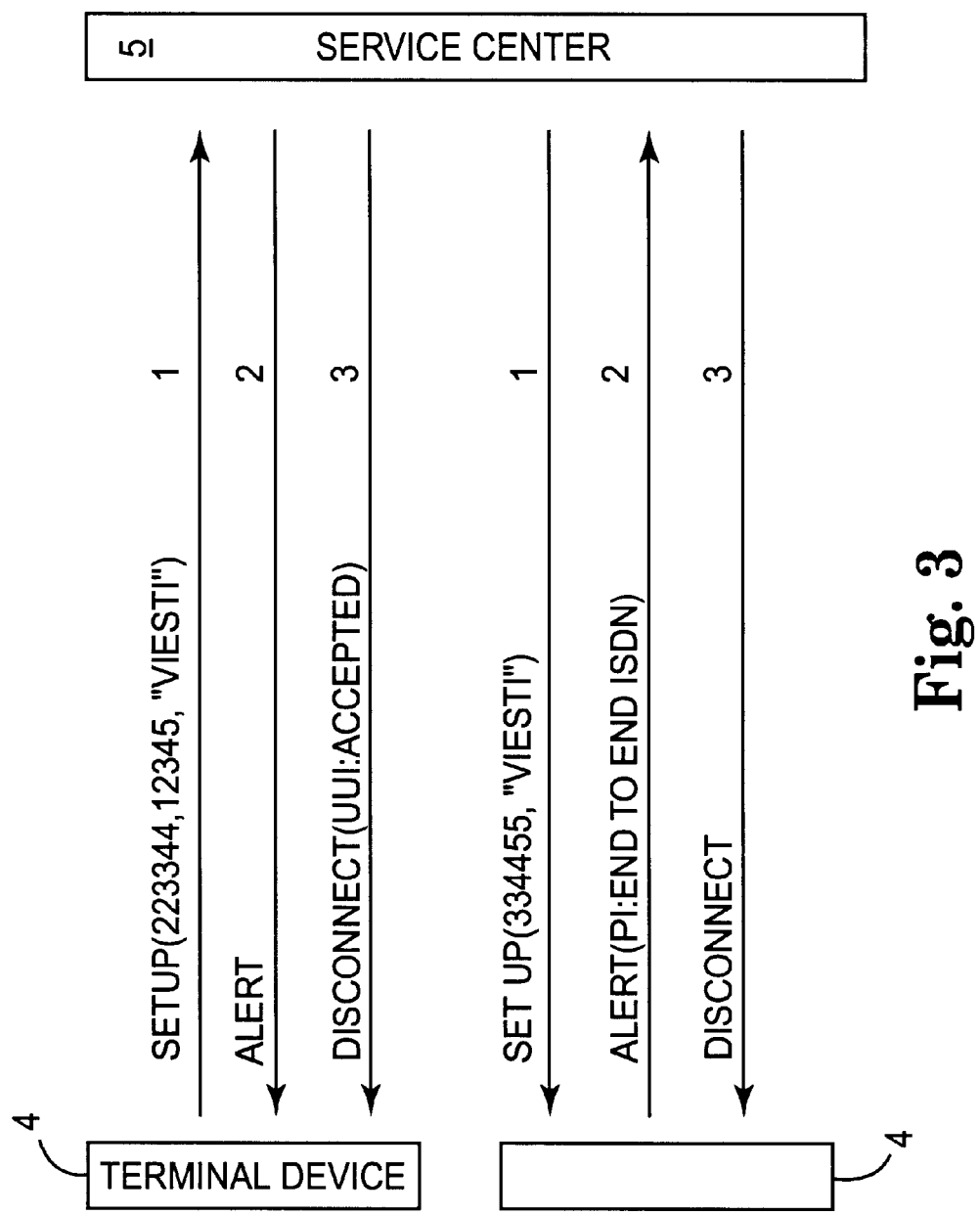
FIG. 3 represents the signalling between a terminal device and a second short-message service centre in a preferred embodiment of the present invention.

FIG. 3 represents the call signalling between the ISDN terminal and the second short-message service centre when a short message is to be transmitted from one ISDN user to another ISDN user or to the GSM network (case A) and when a short message is to be transmitted from the GSM system or from another ISDN user to an in ISDN user (case B).

When a short message is to be transmitted from an ISDN network to a GSM network, e.g. User-to-User information elements are used for the transmission of the message. It is also possible to transmit the messages either in packet data format or by some other standard transmission method. The ISDN terminal 4 generates a setup message, which comprises the short-message service number 223344, the number of the receiver 12345 and, in USSS information elements, the "information". The message is transmitted from the ISDN terminal to the first short-message service centre 2, arrow 1. The short-message service centre 2 may acknowledge receipt of the setup message, arrow 2. This acknowledgement is optional.

After the short-message service centre 2 has received and processed the setup message, it sends to the ISDN terminal 4 a disconnected message, to which is added a signal indicating that the information elements have been accepted.

When the short message is received in the first short-message service centre 2, it is routed to the intended GSM subscriber, as described in the GSM specifications. If the short message cannot be delivered to the receiver within a prescribed length of time, the short-message service centre 2 will notify the sender of the message about the failure. This notification is effected using normal telephonic techniques.

A short message sent by a GSM subscriber is always first directed to the first short-message service centre 2. Depending on the receiver's telephone number, the short-message service centre routes the short message either back into the GSM network or to the second short-message service centre 5 or it starts call setup directly to the subscriber if the receiver is a subscriber in the ISDN network. The second short-message service centre 5 transmits the short message it has received from the GSM mobile telephone into the ISDN network and takes care that the short message is delivered to the intended receiver. If it fails to deliver the short message within a prescribed length of time, a short message indicating failure of transmission is sent to the GSM mobile telephone.

A short message from one ISDN terminal to another ISDN terminal is transmitted using the UUS supplementary service. The short message is generated using e.g. means 7 provided in the terminal device, by means of which a predetermined short message is selected from a menu and the receiver is specified. Once the short message is ready to be sent, call setup to the first or the second short-message service centre 2, 5 is started. However, the call is not set up in speech mode, but instead the UUS information elements containing the short message are transmitted during the setup and ringing phase. The number of the receiver is transmitted in the called party subaddress field as described above.

Correspondingly, the first or the second short-message service centre 2, 5 delivers the short message to the ISDN terminal by using the receiver's telephone number 334455 as called party number and the number of the sender of the short message as calling party number. In this case, too, the short message is conveyed to the receiver in the UUS information elements during the setup and ringing phase.

The ISDN terminal preferably supports the UUS supplementary service and the Subaddressing (SUB) supplementary service. The user interface of the terminal device can be implemented e.g. using menu control 7, through which the user can select the short message to be sent and enter the number of the receiver.

The invention is not restricted to the above-described examples of its embodiments, but many variations are possible within the scope of protection the claims presented below.

What is claimed is:

1. A method for the transmission of a short message in a telecommunication network comprising:

coupling a mobile communication network, which comprises a first short-message service center, with a telephone network, wherein digital signalling is used;

generating a short message by a terminal device and sending the short message to an intended receiver and a receiver's subscriber type is checked in a short-message service centre, wherein the terminal device being compatible with the mobile communication and telephone network;

connecting the telephone network to the first short-message service centre via a first data communication link;

adding the receiver's subscriber type identifier to the short message;

transmitting the short message to the first short-message service centre; and if the receiver is a subscriber in the telephone network, then starting a call setup to an intended subscriber in the telephone network and the short message is transmitted during the call setup to the intended subscriber;

if the receiver is a subscriber in the mobile communication network, then transmitting the short message to the intended receiver in accordance with the short message specifications for the mobile communication network.

2. The method as defined in claim 1, wherein the telephone network is an ISDN network and the mobile communication network is a GSM network.

3. The method as defined in claim 1, wherein a number of short-message service centres are linked to the telephone network and that they are connected to the first short-message service centre.

4. The method as defined in claim 1, wherein routing of the short message between the mobile communication network and the telephone network is effected in the first short-message service centre.

5. The method as defined in claim 1, wherein a short message is transmitted from an ISDN terminal by setting up a call between the sending ISDN terminal and the first short-message service center to transmit the short message to a second short-message service centre.

6. The method as defined in claim 1, wherein a short message is transmitted to an ISDN terminal by setting up a call between the receiving ISDN terminal and a second short-message service centre to transmit the short message to the short-message service centre, from where it is to be routed further.

7. The method as defined in claim 1, wherein the transmission of the short message in the ISDN network is implemented using UUS signalling, wherein when a short message is sent from an ISDN terminal, UUS information elements needed for the transmission of the short message are transferred during a ringing phase to the short-message service centre and further to an intended receiver.

8. The method as defined in claim 1, wherein the identifier of the intended receiver is transmitted in a called subscriber subaddress field.

9. The method as defined in claim 1, wherein the transmission is monitored to determine whether the message is successfully transmitted to the intended subscriber, and if the transmission fails, corresponding information is sent to the sender of the short message.

10. The method as defined in claim 1, wherein the transmission is monitored to determine whether the message is successfully transmitted to the intended subscriber and, when the transmission is successfully completed, corresponding information is sent to the sender of the short message.

11. The method as defined in claim 1, wherein a queuing feature of the telephone network is utilised if the receiving subscriber in the telephone network or the first short-message service centre is busy when call setup is started.

* * * * *